United States Patent [19]

Michiyama

[11] Patent Number: 4,638,682
[45] Date of Patent: Jan. 27, 1987

[54] AUXILIARY PEDAL DEVICE FOR TRICK-CYCLING ATTACHED TO THE FRONT FORK BLADE OF A BICYCLE

[76] Inventor: Hisao Michiyama, No. 48-1, Yahiro 2-Chome, Sumida-Ku, Tokyo, Japan

[21] Appl. No.: 769,960

[22] Filed: Aug. 26, 1985

[30] Foreign Application Priority Data

Jun. 19, 1985 [JP] Japan .............................. 60-91544[U]

[51] Int. Cl.⁴ ............................................. G05G 1/14
[52] U.S. Cl. ....................................... 74/560; 74/564; 280/291
[58] Field of Search ................... 280/291; 74/560, 564

[56] References Cited

U.S. PATENT DOCUMENTS 379,557  3/1888  Benfield .............................. 280/291
507,412 10/1893  Broadbent ........................... 280/291

Primary Examiner—Larry I. Schwartz
Attorney, Agent, or Firm—Michael J. Striker

[57] ABSTRACT

A removably-attachable pedal attachment for trick-cycling bicycles includes a fixture attachable to a front fork blade of the bicycle and provided with brackets which support a shaft on which two spaced suspended plates of the pedal are rotatably supported. Each plate has an extending portion which engages a lower edge of the fixture. A spring supported on the shaft and having an end engaged on the fixture has a bent portion adapted to push up the underside of the pedal.

3 Claims, 4 Drawing Figures

AUXILIARY PEDAL DEVICE FOR TRICK-CYCLING ATTACHED TO THE FRONT FORK BLADE OF A BICYCLE

BACKGROUND OF THE INVENTION

The present invention relates to an auxiliary pedal device for trick-cycling which is attached to the front fork blades of the bicycle.

Heretofore, many bicycles for trick-cycling are known, which have auxiliary pedal devices attached to optional portions of the bicycles. These pedal devices are fixed by direct welding to required portions of the chain stays or the front fork blades so as to be united with the bicycles. Namely, they need a superfluous welding process. Accordingly, they protrude from both sides, and therefore are inconvenient for ordinary cycling in addition to trick-cycling.

SUMMARY OF THE INVENTION

Therefore, an object of this invention is to provide a removably-attachable auxiliary pedal device to the front fork blade, which would avoid the above defects. Another object of this invention to provide a pedal device which would be capable of bringing it down for ordinary cycling as the pedal is attached to it. Furthermore yet another object of this invention is to produce an independent auxiliary pedal device.

These and other objects of the invention are attained by an auxiliary pedal device which comprises a pedal, a plate spring, a fixture, and a counterpart fixture. Said device may be easily installed to the front fork blade by the pair of the fixture and the counter-part fixture for trick-cycling or be dismantled from it for ordinary cycling.

This invention will be better understood and advantages of this invention will be apparent upon perusal of the following description taken in connection with drawings, in which:

BRIEF DESCRIPTION OF THE DRAWINGS

FIG. 3 is a sectional side elevational view taken on line III—III of FIG. 2 by.

DETAILED DESCRIPTION OF THE PREFERRED EMBODIMENTS

Figure 1:
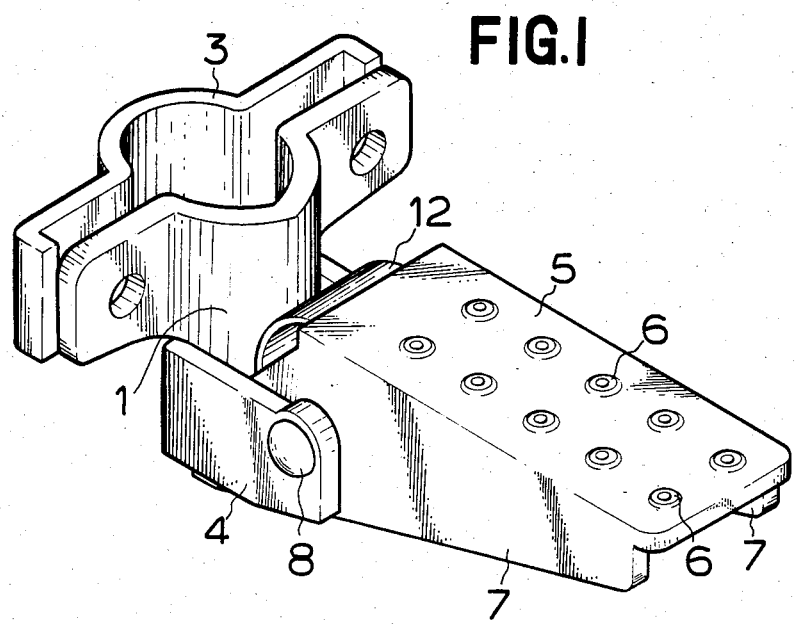
FIG. 1 is a perspective view of an auxiliary pedal device of this invention.
Figure 2:
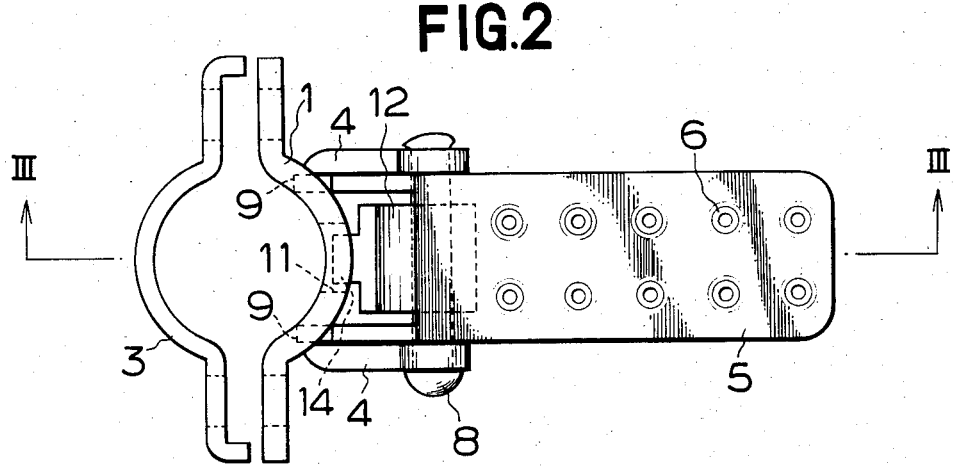
FIG. 2 is a plan view of the pedal of FIG. 1.

Referring more particularly to the drawings, the preferred embodiment of this invention will now be described as follows. A fixture 1 is attached to a front fork blade 2 together with a counter-part fixture 3 and is provided with a pair of parallel brackets 4 positioned at both sides of the lower portion of fork blade 2, which brackets confront each other. A pedal 5 has a plurality of bosses 6 on its upper face, which prevent slipping on said upper face, and is provided with a pair of downwardly hung side plates 7 at both sides thereof. Said side plates 7 are inserted between brackets 4 and mounted rotably on a supporting shaft 8 fixed to the brackets 4. The inside lower corners of said plate 7 are formed as a pair of stopper pawls 9 which are adapted to contact to the lower edges 10 of the fixture 1. A plate spring 12 is inserted in a rectangular hole 11 formed in the the lower portion of the fixture 1 with its end 14 and it is fixedly mounted on the supporting shaft 8 with the other semi-circularly bent end 13, and a circularly bent intermediate portion of the spring is made to contact the inner edge 15 of the lower face of the pedal 5.

Figure 3:
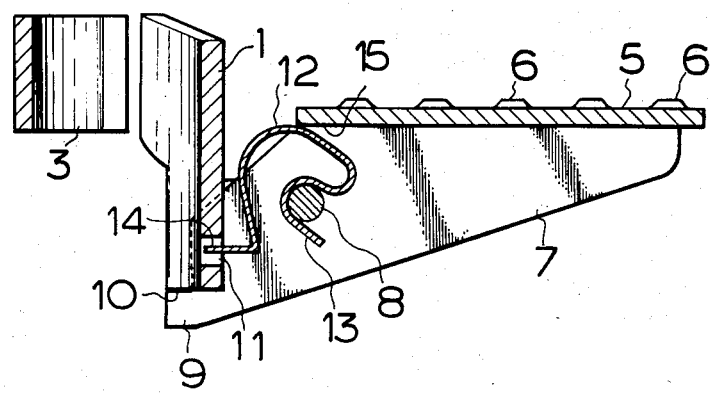
Figure 4:
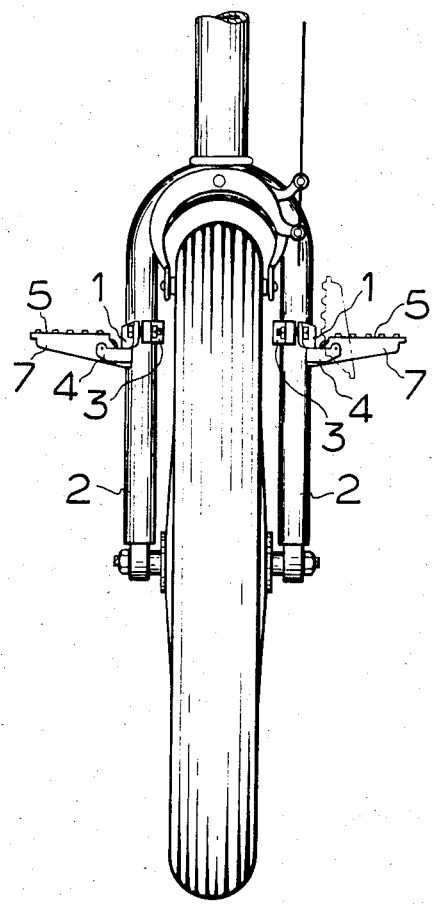
FIG. 4 is a front elevational view of a front wheel of the bicycle which is equipped to the front fork blade with a pair of the auxiliary pedal devices thereof.

The auxiliary pedal device of this invention is formed as described above, so the front fork blades 2 have the fixture 1 fixed to them together with the counter-part fixture 3 by screwing bolts and nuts through perforated holes of the fixture 1 as shown in FIG. 4. In this case, the stopper pawl 9 which is a portion of the inner lower corner of the side plate 7 is adapted to contact and stop to the lower edge 10 of the fixture 1 as shown in FIG. 3, so that pedal 5 is stable against a considerably large load and is also supported by contact of the plate spring 12 so that it is not shaken arbitrarily. But when the pedal 5 is raised up by opposing the pressure of the plate spring 12, it stands as shown by a dash-dotted line in FIG. 4 and remains stable at a standing condition due to the pressure of the plate spring 12. The fixture 1 is made to be attached to the front fork blade 2 together with the counter-part fixture 3 by bolts and nuts, so it may be easily disconnected from the front fork blade 2 by loosening those bolts and the nuts.

As described above, the auxiliary pedal device is distinguished from the customary welded pedal devices so as to be attached to and be disconnected from the front fork blade and when said auxiliary pedal device remains to be attached to the front fork blade, the pedal may be voluntarily raised up from a sideward protruding condition so as to not hinder ordinary cycling.

Thus, the auxiliary pedal device of this invention is a novel and useful device for trick-cycling.

What is claimed as new and desired to be secured by Letters Patent of the United States is:

1. An auxiliary pedal device for trick-cycling attached to a front fork blade of a bicycle, comprising a pedal, a plate spring, and a pair including a fixture and a counterpart fixture, said fixture being adapted to be attached to the front fork blade of the bicycle together with said counterpart fixture by bolts and nuts and provided with a pair of parallel brackets positioned at both sides of a lower portion of the fork blade, said brackets protruding from the fork blade in two opposite directions, said pedal having an upper face and being provided with a pair of side plates positioned at both sides thereof, said side plates being inserted between said brackets, a supporting shaft fixed to the brackets and rotatably supporting said plates, said brackets having a pair of stopper pawls which are outwardly extending from said brackets, said fixture having a hole and a lower edge, said pawls being engaged with said lower edge, said plate spring having a first end portion engaged in said hole of said fixture, a second end portion supported on said shaft, and an intermediate portion which is circularly bent to engage and push up an underside of said pedal.

2. The pedal device as defined in claim 1, wherein said side plates are suspended downwardly at both sides of the pedal.

3. The pedal device as defined in claim 1, wherein said upper face of the pedal has a plurality of protruding bosses.

* * * * *